US009582160B2

(12) United States Patent
Circlaeys et al.

(10) Patent No.: US 9,582,160 B2
(45) Date of Patent: Feb. 28, 2017

(54) SEMI-AUTOMATIC ORGANIC LAYOUT FOR MEDIA STREAMS

(71) Applicant: Apple Inc., Cupertino, CA (US)

(72) Inventors: Eric Circlaeys, Paris (FR); Kjell Bronder, San Francisco, CA (US); Ralf Weber, San Jose, CA (US)

(73) Assignee: Apple Inc., Cupertino, CA (US)

( * ) Notice: Subject to any disclaimer, the term of this patent is extended or adjusted under 35 U.S.C. 154(b) by 124 days.

(21) Appl. No.: 14/080,522

(22) Filed: Nov. 14, 2013

(65) Prior Publication Data

US 2015/0135069 A1    May 14, 2015

(51) Int. Cl.
| | |
|---|---|
| G06F 3/0484 | (2013.01) |
| G06F 17/30 | (2006.01) |
| G06F 17/21 | (2006.01) |
| G06T 3/40 | (2006.01) |
| G06F 3/0488 | (2013.01) |

(52) U.S. Cl.
CPC ........ *G06F 3/0484* (2013.01); *G06F 3/04886* (2013.01); *G06F 17/212* (2013.01); *G06F 17/30056* (2013.01); *G06T 3/4038* (2013.01)

(58) Field of Classification Search
CPC ............. G06F 17/30056; G06F 17/212; G06F 17/4038
See application file for complete search history.

(56) References Cited

U.S. PATENT DOCUMENTS

| | | |
|---|---|---|
| 4,969,204 A | 11/1990 | Jones |
| 5,263,136 A | 11/1993 | DeAguiar |
| 5,532,716 A | 7/1996 | Sano |
| 5,880,739 A | 3/1999 | Collins |
| 6,141,446 A | 10/2000 | Boliek |
| 6,208,762 B1 | 3/2001 | Garland |
| 6,307,559 B1 | 10/2001 | Hancock |
| 6,411,302 B1 | 6/2002 | Chiraz |
| 6,496,980 B1 | 12/2002 | Tillman |
| 6,636,215 B1 | 10/2003 | Greene |
| 6,741,864 B2 | 5/2004 | Wilcock |
| 6,924,814 B1 | 8/2005 | Ephanov |
| 7,426,696 B1 | 9/2008 | Hwang |

(Continued)

OTHER PUBLICATIONS

Bechtolsheim et al., "High-Performance Raster Graphics for Microcomputer Systems," 1980, Computer Systems Laboratory, Stanford University, ACM.

(Continued)

*Primary Examiner* — William Bashore
*Assistant Examiner* — Daniel Parcher
(74) *Attorney, Agent, or Firm* — Blank Rome LLP

(57) ABSTRACT

In order to display a set of media items in a visually pleasing manner, the relationship between the set of media items and a plurality of predefined media arrangements may be determined. A score corresponding to the set of media items may be compared to a score corresponding to each of the predefined media arrangements. The media item score and the media arrangement scores may be based on properties of the media items and properties of the media arrangements, respectively. The media arrangement that is most closely related to the set of media items may be identified based on the score comparison and the media items may be displayed in the identified media arrangement.

19 Claims, 8 Drawing Sheets

(56) References Cited

U.S. PATENT DOCUMENTS

| | | |
|---|---|---|
| 7,751,596 B2 | 7/2010 | Rhoads |
| 7,808,514 B2 | 10/2010 | Yu |
| 8,001,143 B1 | 8/2011 | Gupta |
| 8,234,558 B2 | 7/2012 | Swift |
| 8,577,911 B1 | 11/2013 | Stepinski |
| 8,655,885 B1 | 2/2014 | Scott |
| 8,713,530 B2 | 4/2014 | Waite |
| 8,867,849 B1 | 10/2014 | Kirkham |
| 2002/0026507 A1 | 2/2002 | Sears |
| 2002/0107973 A1 | 8/2002 | Lennon |
| 2002/0152226 A1 | 10/2002 | Burnett |
| 2003/0018607 A1 | 1/2003 | Lennon |
| 2003/0128210 A1 | 7/2003 | Muffler |
| 2003/0147097 A1 | 8/2003 | Kotani |
| 2003/0167257 A1 | 9/2003 | deBonet |
| 2003/0177197 A1 | 9/2003 | deBonet |
| 2003/0188016 A1 | 10/2003 | Agarwalla |
| 2003/0188021 A1 | 10/2003 | Challenger |
| 2004/0172495 A1 | 9/2004 | Gut |
| 2004/0240746 A1 | 12/2004 | Aliaga |
| 2005/0050043 A1 | 3/2005 | Pyhalammi |
| 2005/0071781 A1* | 3/2005 | Atkins .................. G06T 11/60 715/838 |
| 2005/0102473 A1 | 5/2005 | Sakata |
| 2005/0175251 A1 | 8/2005 | Taketa |
| 2005/0193083 A1 | 9/2005 | Han |
| 2005/0206658 A1 | 9/2005 | Fagans |
| 2006/0028659 A1 | 2/2006 | Nishikawa |
| 2006/0064630 A1* | 3/2006 | Balinsky .............. G06F 17/212 715/277 |
| 2006/0109343 A1 | 5/2006 | Watanabe |
| 2007/0050467 A1 | 3/2007 | Borrett |
| 2007/0074110 A1 | 3/2007 | Miksovsky |
| 2007/0222865 A1 | 9/2007 | Levien |
| 2007/0223887 A1 | 9/2007 | Kanamori |
| 2007/0253479 A1 | 11/2007 | Mukherjee |
| 2008/0091526 A1 | 4/2008 | Shoemaker |
| 2008/0147974 A1 | 6/2008 | Madison |
| 2008/0162485 A1 | 7/2008 | Long |
| 2008/0181498 A1 | 7/2008 | Swenson |
| 2008/0292265 A1 | 11/2008 | Worthen |
| 2008/0313405 A1 | 12/2008 | Sakata |
| 2009/0083279 A1 | 3/2009 | Hasek |
| 2009/0244079 A1 | 10/2009 | Carson |
| 2009/0274366 A1 | 11/2009 | Iourcha |
| 2010/0046842 A1 | 2/2010 | Conwell |
| 2010/0095340 A1 | 4/2010 | Ei |
| 2010/0161582 A1 | 6/2010 | Spohr |
| 2010/0180234 A1 | 7/2010 | Szuszczewicz |
| 2010/0274674 A1 | 10/2010 | Roberts |
| 2010/0329588 A1* | 12/2010 | Cheatle .............. G06K 9/00234 382/298 |
| 2011/0026593 A1 | 2/2011 | New |
| 2011/0026835 A1 | 2/2011 | Ptucha |
| 2011/0064301 A1 | 3/2011 | Sun |
| 2011/0179075 A1 | 7/2011 | Kikuchi |
| 2011/0202847 A1 | 8/2011 | Dimitrov |
| 2011/0212717 A1 | 9/2011 | Rhoads |
| 2011/0314202 A1 | 12/2011 | Iyigun |
| 2012/0072656 A1 | 3/2012 | Archak |
| 2012/0084276 A1 | 4/2012 | Heimendinger |
| 2012/0084343 A1 | 4/2012 | Mir |
| 2012/0092997 A1 | 4/2012 | Mihaly |
| 2012/0150651 A1 | 6/2012 | Hoffberg |
| 2012/0159558 A1 | 6/2012 | Whyte |
| 2012/0173824 A1 | 7/2012 | Iyigun |
| 2012/0191716 A1 | 7/2012 | Omoigui |
| 2012/0206498 A1 | 8/2012 | Kai |
| 2012/0210068 A1 | 8/2012 | Joshi |
| 2012/0233221 A1 | 9/2012 | Katari |
| 2012/0303575 A1 | 11/2012 | Crolene |
| 2013/0007667 A1 | 1/2013 | Sauve |
| 2013/0018875 A1 | 1/2013 | Qiao |
| 2013/0028508 A1 | 1/2013 | Perronnin |
| 2013/0050254 A1 | 2/2013 | Tran |
| 2013/0055081 A1 | 2/2013 | Limbasia |
| 2013/0159328 A1 | 6/2013 | McConnell |
| 2013/0173853 A1 | 7/2013 | Ungureanu |
| 2013/0194438 A1 | 8/2013 | Sweet |
| 2013/0218721 A1 | 8/2013 | Borhan |
| 2013/0311329 A1 | 11/2013 | Knudson |
| 2014/0015873 A1 | 1/2014 | Kasai |
| 2014/0063031 A1 | 3/2014 | Brasnett |
| 2014/0111545 A1 | 4/2014 | Damola |
| 2014/0112394 A1 | 4/2014 | Sullivan |
| 2014/0125685 A1 | 5/2014 | Yeh |
| 2014/0126841 A1 | 5/2014 | Wang |
| 2014/0140589 A1 | 5/2014 | Klotzer |
| 2014/0189487 A1 | 7/2014 | Kwan |
| 2014/0222560 A1 | 8/2014 | Kota |
| 2014/0270407 A1 | 9/2014 | Balakrishnan |
| 2014/0344705 A1 | 11/2014 | Dimitrov |
| 2014/0365905 A1* | 12/2014 | Chedeau .............. G06F 3/0481 715/744 |
| 2015/0019545 A1* | 1/2015 | Chedeau ............ G06F 17/3053 707/725 |
| 2015/0135069 A1 | 5/2015 | Circlaeys |
| 2015/0135134 A1 | 5/2015 | Circlaeys |
| 2015/0189107 A1* | 7/2015 | Murata .................. G06T 11/60 345/629 |
| 2015/0254806 A1 | 9/2015 | Circlaeys |
| 2016/0034559 A1 | 2/2016 | Feyereisl |

OTHER PUBLICATIONS

Guthe et al., "Advanced Techniques for High-Quality Multi-Resolution Volume Rendering," 2004, Computers & Graphics 28, Elsevier.

Lindstrom et al., "On-the-Fly Decompression and Rendering of Multiresolution Terrain," 2010, Association for Computing Machinery, ACM.

Rauschenbach et al., "Demand-Driven Image Transmission with Levels of Detail and Regions of Interest," 1999, Computers & Graphics 23, Elsevier.

* cited by examiner

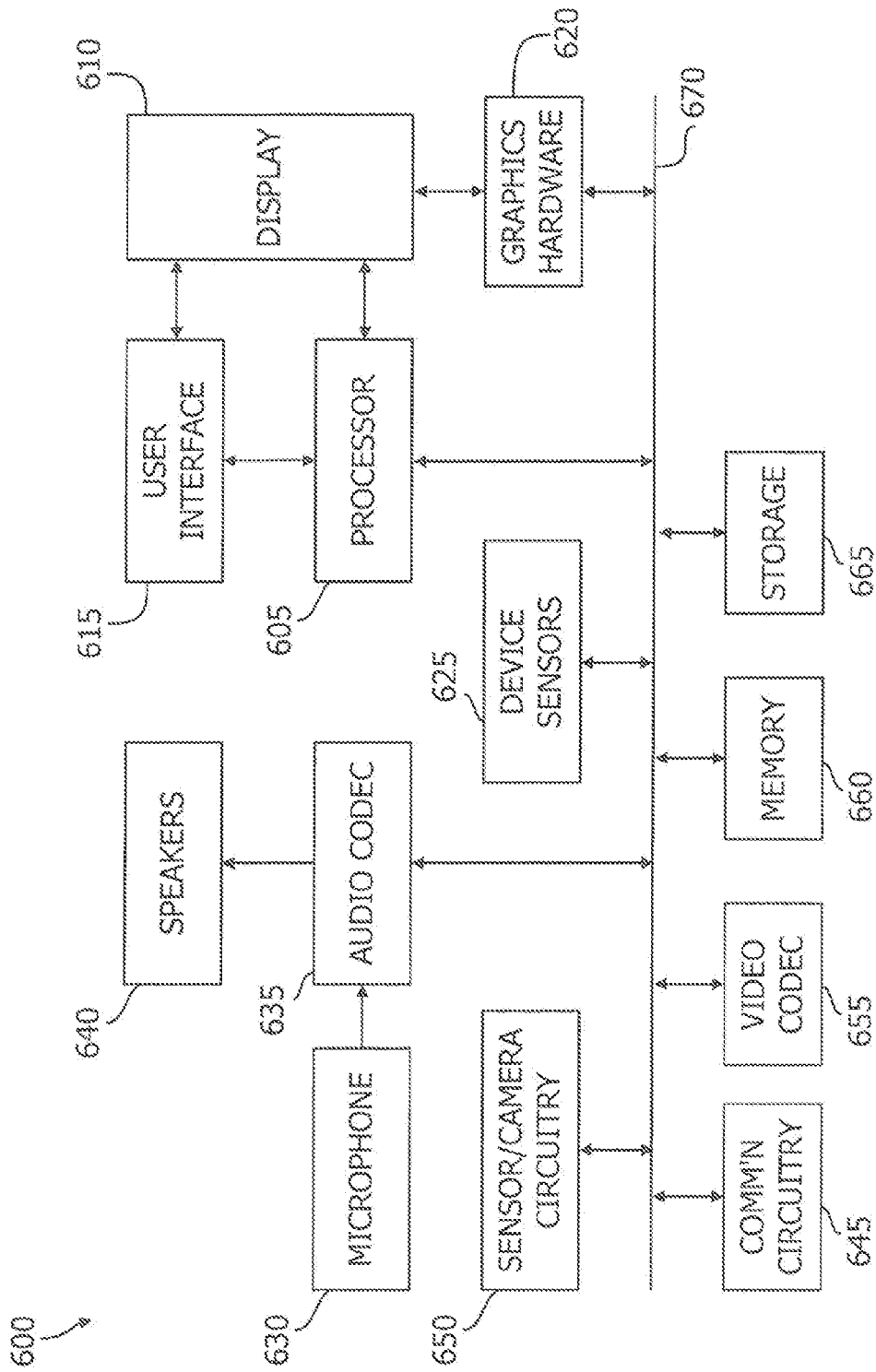

SEMI-AUTOMATIC ORGANIC LAYOUT FOR MEDIA STREAMS

BACKGROUND

This disclosure relates generally to techniques to display media items in a visually pleasing arrangement. More particularly, the disclosure relates to techniques to efficiently organize media items in a visually pleasing arrangement.

With the rapid increase in the number of devices capable of capturing digital media and the number of repositories for such media, there exists a need for an interface that is capable of aggregating, sorting, and displaying all of the media to which a user has access in a visually pleasing manner. Unlike traditional media item displays which generally include display frames having a common size and repetitive spacing, a visually pleasing display of media items may include a more natural and random arrangement of media items in display frames having varying sizes and orientations. Many of the devices capable of capturing and displaying media items in a more visually pleasing arrangement may have relatively limited memory and processing capabilities (e.g., mobile devices such as phones, tablets, and PDAs).

SUMMARY

In order to display a set of media items in a visually pleasing manner, a method may include determining the relationship between the set of media items and a plurality of predefined media arrangements. A score corresponding to the set of media items may be compared to a score corresponding to each of the predefined media arrangements to generate a comparison score for each media item set/media arrangement pair. The media item score and the media arrangement scores may be based on properties of the media items and properties of the media arrangements, respectively. The media arrangement that is most closely related to the set of media items may be identified based on the comparison scores and the media items may be displayed in the identified media arrangement. The method may be embodied in program code and stored on a non-transitory medium. The stored program code may be executed by one or more processors that are part of, or control, a system that is configured to implement the method.

BRIEF DESCRIPTION OF THE DRAWINGS

FIG. 6 shows an illustrative electronic device in accordance with one embodiment.

DETAILED DESCRIPTION

This disclosure pertains to systems, methods, and computer readable media for identifying a media arrangement for displaying media items (e.g., digital images, digital videos, etc.). In general, a set of media items may be matched to, and displayed in accordance with, one of a number of predefined media arrangements as described in co-pending applications entitled "Viewable Frame Identification", and "Multi-Source Media Aggregation", both of which are being filed concurrently with this application and the contents of which are incorporated herein by reference. More specifically, in one embodiment, a score is calculated for each of a finite number of predefined media arrangements. When a request to display media items in a media set is received, one or more media subsets (i.e., a subset of the media items in the media set) are identified and a score is calculated for each of the one or more media subsets. The scores for the one or more media subsets can be compared to the predetermined scores of the media arrangements, and the most compatible media subset/media arrangement pair can be identified based on the scores. The media items from the media subset from this pair may be displayed according to the corresponding media arrangement of the pair.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and time-consuming, but would nevertheless be a routine undertaking for those of ordinary skill in the art of media processing having the benefit of this disclosure.

Figure 1:
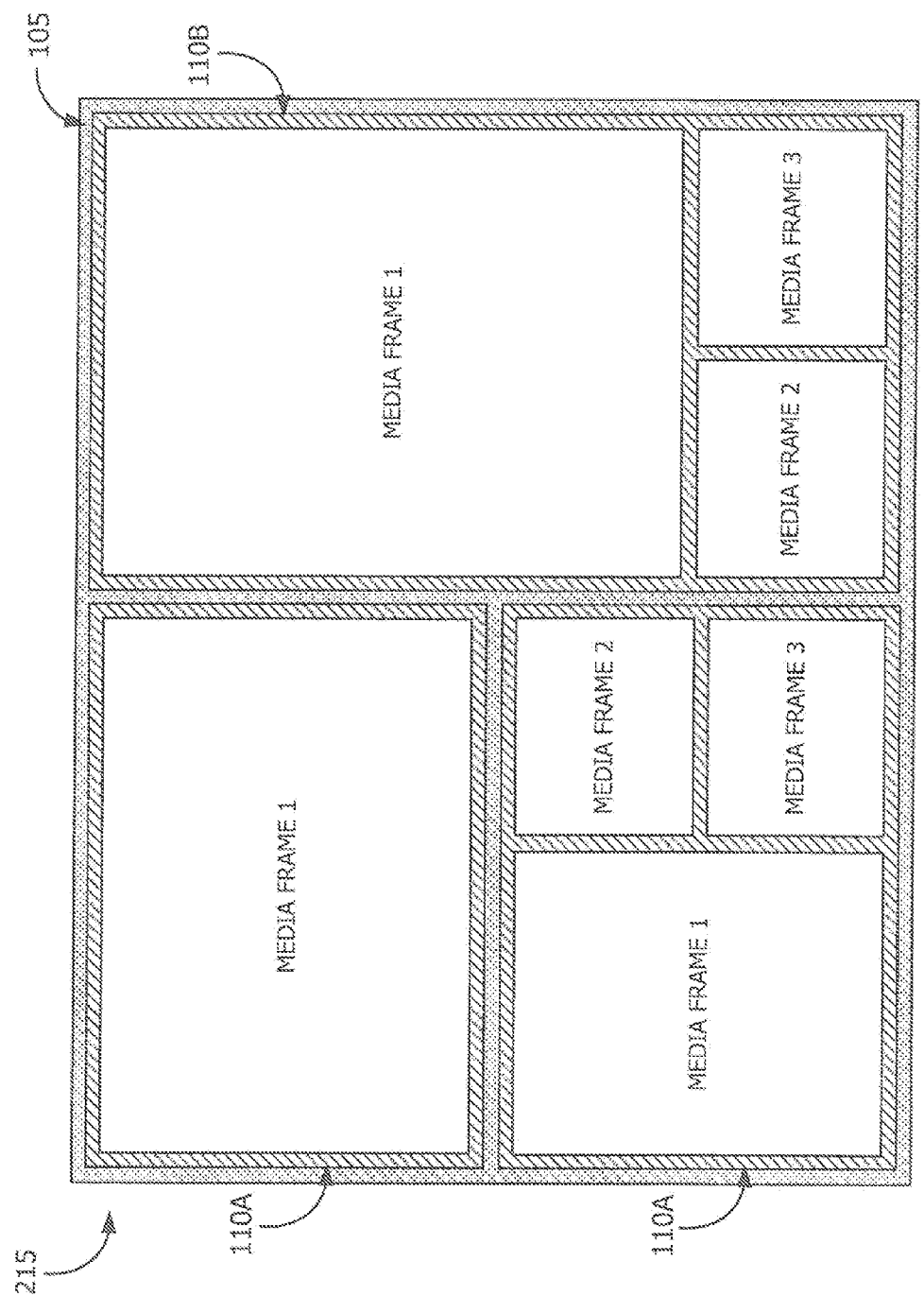
FIG. 1 illustrates an arrangement of media frames on a media page in accordance with one embodiment.

Referring to FIG. 1, a media arrangement for displaying media items is illustrated. In the illustrated embodiment, a media layout is defined in terms of pages and groups. A page may contain a unique set of groups. Each group may, in turn, contain a set of media frames. For any particular group, media frames may be arranged within the group in multiple predefined ways. Each of the different arrangements of media frames within a group may be described as a derivative of the group. In the illustrated embodiment, page 105 contains two groups 110A and another group 110B. The media frames in groups 110A are arranged according to two different derivatives. A first derivative of group 110A displays a single media frame in a landscape orientation. The first derivative of group 110A is positioned in the top left portion of page 105 in the illustrated embodiment. A second derivative of group 110A displays three media frames. A first of the three media frames is displayed on the left side of group 110A in a portrait orientation. The two additional media frames of the second derivative of group 110A are stacked landscape orientation frames on the right side of group 110A. The second derivative of group 110A is positioned in the bottom left portion of page 105.

Group 110B occupies the right side of page 105. The particular derivative of group 110B in the illustrated embodiment includes three media frames. A first media frame in group 110B has a portrait orientation and occupies the top portion of group 110B. The two additional media frames of group 110B are landscape oriented media frames in a side-by-side arrangement at the bottom of group 110B. The particular orientation of groups within a page and media frames within the groups forms a unique arrangement of media items. For example, the orientation of groups 110A and 110B and the arrangement of media frames within those groups in page 105 forms unique media arrangement 215. As will be described in greater detail below, an arrangement score can be generated for each unique media arrangement according to a particular weighting function.

It will be understood that media arrangement 215 is illustrated for the purpose of describing the terminology that will be used throughout this Specification rather than to illustrate any preferred arrangement. In different embodiments, groups may be defined with irregular shapes (e.g., not a simple rectangular shape) to accommodate media frames of various sizes and to combine with other groups to create a visually pleasing arrangement within a page. The properties (e.g., size, shape, aspect ratio, etc.) of groups, the arrangement of groups within a page, and the arrangement of media frames within a group to form multiple group derivatives may be defined by a media designer to provide visually pleasing media arrangements.

Figure 2:
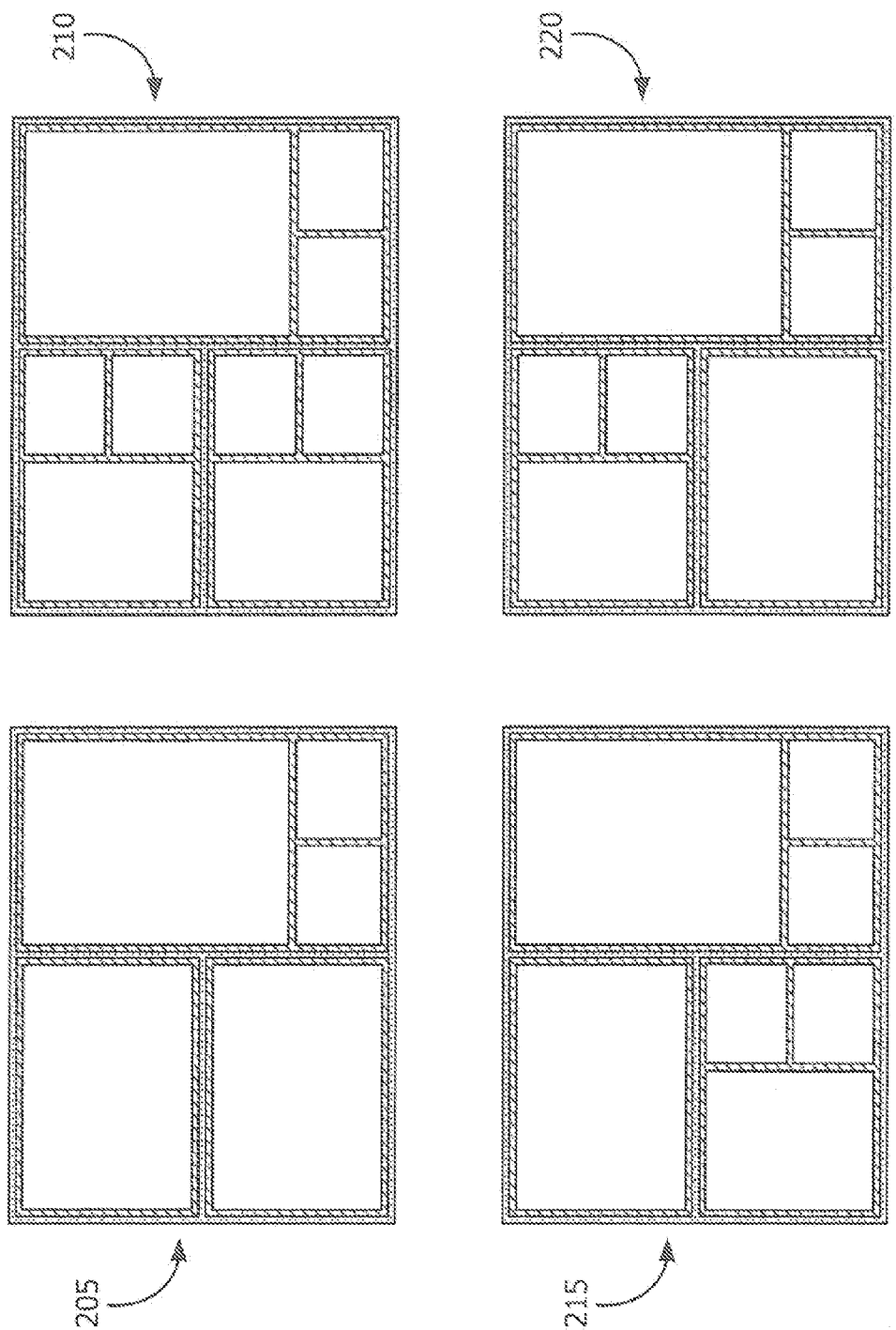
FIG. 2 illustrates various different media arrangements using a predefined layout of media groups on a media page in accordance with one embodiment.

Referring to FIG. 2, different orientations and combinations of groups and group derivatives within a page can be used to form multiple unique media arrangements. For example, the page layout (i.e., the positioning of groups 110A and 110B within page 105) results in unique arrangements 205, 210, 215, and 220 when just the two described derivatives of group 110A are taken into account. It can be seen that a large number of unique media arrangements may be obtained from a relatively small number of groups and group derivatives. For example, altering the location of groups within a page (e.g., switching groups 110A to the right side of page 105 and group 110B to the left side of page 105) or increasing the number of group derivatives (e.g., creating a group 110B derivative with the side-by-side landscape oriented media frames above the portrait media frame or creating an additional group 110A derivative with the stacked landscape oriented media frames on the left side of the portrait media frame) greatly increases the number of unique arrangements that can be constructed.

While increasing the number of media arrangements increases the pool of potential fits for a given set of media items, the desire to increase the number of predefined media arrangements must be weighed against the required processing resources to locate the appropriate arrangement and fit the media to the arrangement. Therefore, in certain embodiments, the number of page layouts (i.e., unique layouts of groups within a page) may be selected to balance the pool of media arrangements with the available processing resources and speed with which media items are fit to a selected arrangement. As will be shown below, even a limited number of page layouts will typically result in a relatively large number of media arrangements. For example, the number of derivatives for each group in a particular page layout will generate multiple media arrangements for the given page layout. Therefore, for a given set of page layouts, a large pool of media arrangements may be available for matching with a media set. In one embodiment, a subset of page layouts may be selected from a full set of page layouts. In such an embodiment, the subset of page layouts may be selected based on a particular device or a device orientation (e.g., landscape oriented pages may be selected from a set of pages including landscape and portrait orientations where a landscape orientation is appropriate based on the device or device orientation), processing capacity (e.g., a larger subset of page layouts may be selected for a device having a higher processing capacity), user settings (e.g., a user may indicate a preference for page layouts having larger groups and smaller number of groups per page), etc.

Figure 3:
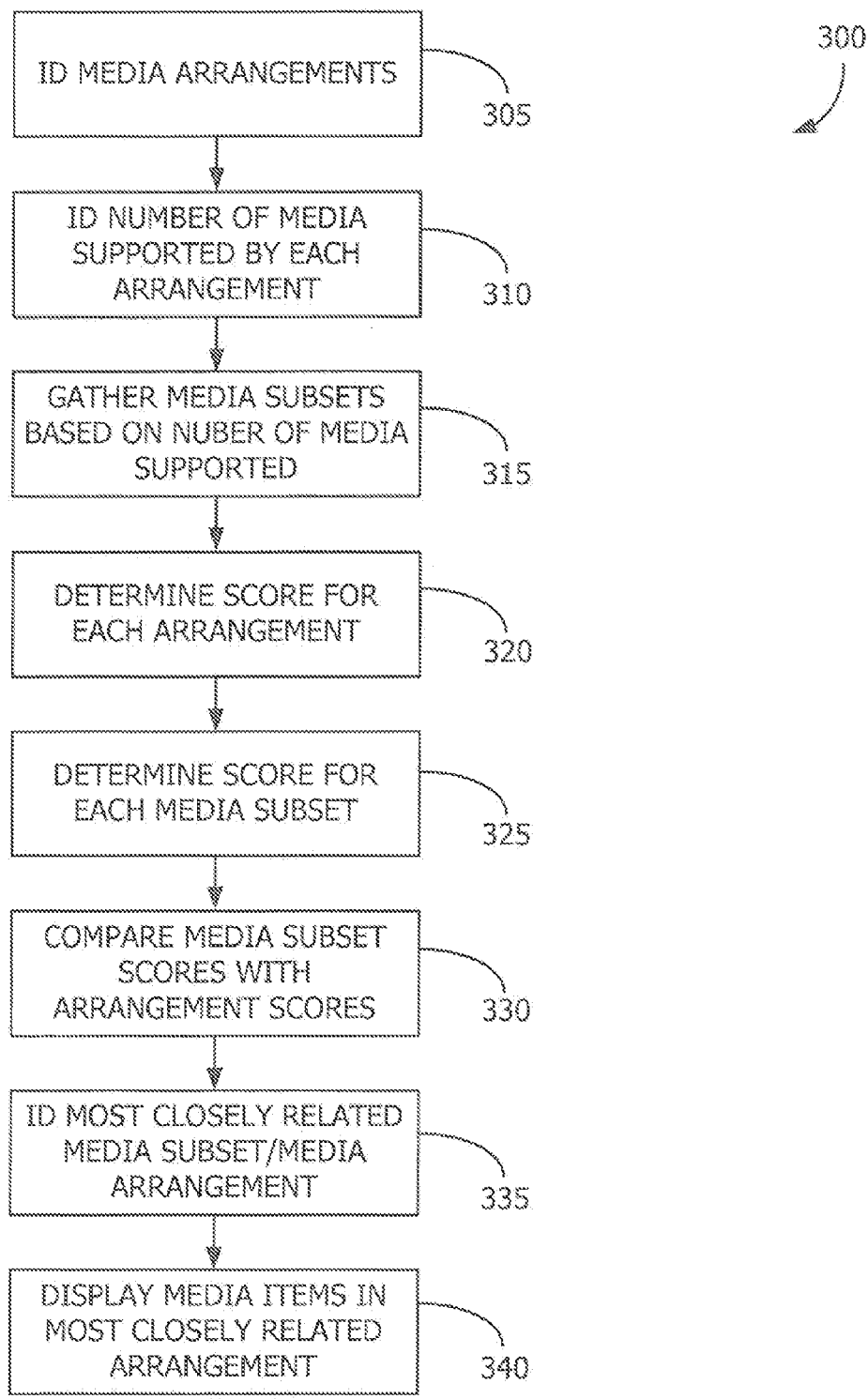
FIG. 3 illustrates an operation to match a media subset to a media arrangement in accordance with one embodiment.

Referring to FIG. 3, an operation to match media items to a media arrangement may begin with an identification of media arrangements (block 305). In one embodiment, the media arrangements may be identified in response to a request (e.g., a user request) to display a group of media items. As set forth above, in one embodiment, the identification of media arrangements may begin with the selection of a subset of page layouts from a full set of predefined page layouts. From a given set of page layouts, the number of media arrangements for each layout may be determined. As described above, a page (P) contains a number of groups (G). This is defined by the page layout. For example, the page layout illustrated in FIGS. 1 and 2 includes two groups 110A arranged in a stacked orientation on the left side of the page and one group 110B that occupies the right side of page 105. A separate page layout may place group 110B on the left side of the page and stacked groups 110A on the right side of the page. While these page layouts may generate the same number of media arrangements (owing to the fact that the groups have the same number of derivatives in either page layout as described below), the generated media arrangements from the different layouts would be unique.

As described above, each group (G) has a specified number of derivatives (D), and each derivative includes a specified number of media frames (M). For a given layout, the total number of possible media arrangements is given by:

$$NA(P) = \prod_{i=0}^{NG(P)} ND(G_i) \tag{1}$$

where NA(P) is equal to the number of media arrangements for the page (P), NG(P) is equal to the number of groups for the page (P), and $ND(G_i)$ is the number of derivatives for a specified group (G) in page (P). By way of example, for the layout illustrated in FIGS. 1 and 2, given the two illustrated derivatives for group 110A, a total number of media arrangements of $ND(G_{110(1)}) \times ND(G_{110A(2)}) \times ND(G_{110B}) = 2 \times 2 \times 1 = 4$ is obtained. This number corresponds to media arrangements 205, 210, 215, and 220 illustrated in FIG. 2. It will be understood that the number of media arrangements for a given page layout increases with an increasing number of derivatives for the groups in the layout. For example, if group 110A included a third derivative in which the stacked landscape orientation media frames appeared on the left side of the portrait media frame and if group 110B included a second derivative in which the side-by-side landscape orientation media frames appeared above the portrait media frame, a total of 18 media arrangements could be generated for the single layout. The identification of media arrangements may be repeated for each page layout in a selected set of page layouts.

After the media arrangements for a selected set of page layouts have been identified, the number of media supported by each of the identified media arrangements may be identified (block 310). Because each derivative for a particular group may contain different numbers of media frames, the range of available media frames for the group of identified media arrangements must be determined. The minimum and maximum number of media items (M) that can be supported for a particular page layout can be identified by:

$$NM_{min}(P) = \sum_{i=0}^{NG(P)} NM_{min}(G_i) \quad (2)$$

$$NM_{max}(P) = \sum_{i=0}^{NG(P)} NM_{max}(G_i) \quad (3)$$

where $NM_{min}(P)$ and $NM_{max}(P)$ represent the minimum and maximum number of media items for a given page layout (P), respectively, and where $NM_{min}(G)$ and $NM_{max}(G)$ represent the minimum and maximum number of media items for a particular group (G), respectively (i.e., the number of media items supported by the most lightly and heavily populated derivatives of a group (G)). By way of example, the $NM_{max}(P)$ value for the page layout in FIGS. 1 and 2 is 3+3+3=9 (corresponding to media arrangement 210) and the $NM_{min}(P)$ for the same layout is 1+1+3=5 (corresponding to media arrangement 205). This operation may be repeated for each page layout in a set of selected page layouts and, from the results, the highest maximum number of media items (i.e., the highest $NM_{max}(P)$ for the selected group of page layouts) and the lowest minimum number of page layouts (i.e., the lowest $NM_{min}(P)$ for the selected group of page layouts) may be identified. The maximum and minimum numbers of media items for the selected set of page layouts are designated as $NM_{max}$ and $NM_{min}$, respectively. These values represent the number of media items required to fill the media arrangement having the most media frames and the media arrangement having the fewest media frames for the selected set of page layouts.

Based on the minimum and maximum numbers of media items for the selected set of page layouts, one or more ordered media subsets may be gathered from a given media set (block 315). The one or more media subsets may be defined as:

$$M[y][z] \text{ for } y=0 \rightarrow NM_{max}-NM_{min} \text{ and } z=0 \rightarrow NM(M[y]) \quad (4)$$

where M[y] is an array of media items, M[y][z] specifies a particular item in the array M[y], and NM(M[y]) is the number of media items in the array M[y]. Referring again to the above example of FIGS. 1 and 2, for the simple situation in which a given media set is fit to single page layout 105, it was noted above that $NM_{min}$ and $NM_{max}$ are 5 and 9, respectively. Therefore, according to Equation 4, five ordered subsets (M[0] through M[4]) of a given media set are needed. The order of media items within any of these defined subsets is given by reference numeral [z]. For example, M[0][2] refers to the third (in a zero-based system) media item in media subset M[0].

Figure 4A:
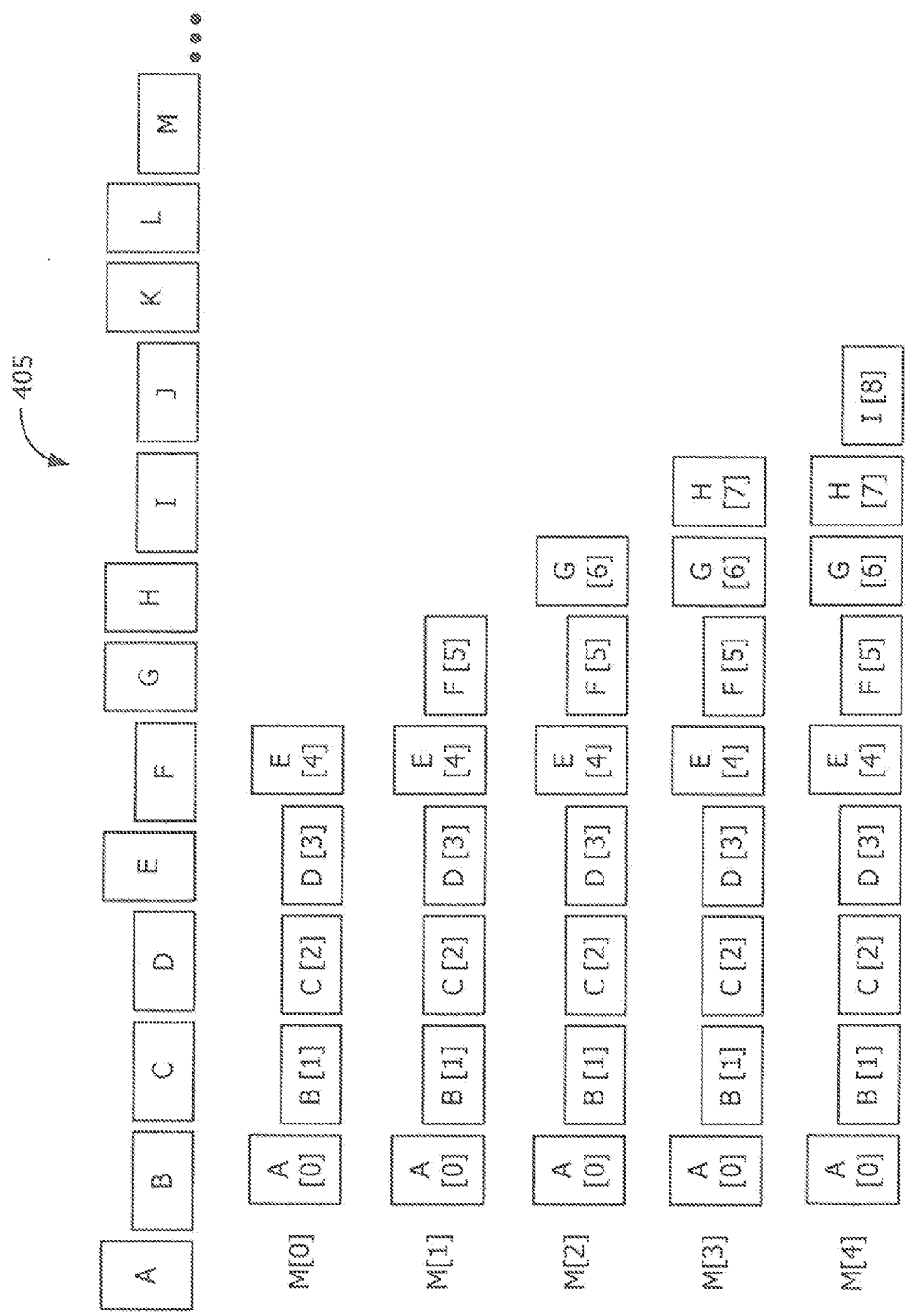
FIGS. 4A and 4B illustrate different arrangements of media items from a media set within various media subsets in accordance with various embodiments.

The selection and ordering of media items from a media set to fill the media item subsets can be performed in different manners. In a first embodiment, the one or more media subsets may be filled based on a structured ordering of available media items. This selection and ordering approach is illustrated in FIG. 4A. In the illustrated embodiment, media items are selected to fill the media subsets according to a specified order of available media items in media set 405 (i.e., beginning with media item A). Media set 405 may include media items from various media sources. For example, media set 405 may include media items captured by a user with a digital image capture device, media items received via electronic communications, media items placed on a user's or a user's friend's social network websites, etc. The media set may therefore include media items stored locally (i.e., in a memory of a device that performs arrangement operations in accordance with this disclosure) or remotely (i.e., in a memory separate from a device that performs arrangement operations in accordance with this disclosure).

In accordance with the "structured" selection and ordering of media items, the media subsets may be filled according to a predefined ordering of media items in media set 405. That is, the number of media items required to fill each of the media subsets may be selected from media set 405 according to a specified order. In one embodiment, the media items in media set 405 may be ordered chronologically. For example, metadata associated with the media items that represents an image capture time may be utilized to order the media items. In another embodiment, the media items may be ordered based on an order in which they are read from a memory or received from a remote device. In yet another embodiment, the media items in media set 405 may be ordered according to an importance ranking of the media items. In such an embodiment, the importance of a media item may be determined based on an online ranking or the number of comments that the media item receives (e.g., via a social networking website). Similarly, the importance of a media item could be determined based on the number of times that the media item has previously been viewed or has been sent via an electronic communication medium. Alternatively, an importance ranking may be determined based on image characteristics. For example, a higher importance ranking may be assigned to a media item having certain predefined characteristics (e.g., brightness, etc.) than a media item without those characteristics.

Ordering the media items in the media subsets according to the structured approach may enable media items to be presented in a media arrangement that takes this ordering into account. For example, a chronological ordering of media items may result in a display of the media items in a media arrangement that depicts the media items chronologically from left to right. Similarly, an importance ordering of the media items may enable more important media items to be displayed in larger media frames, in media frames closer to the center of a particular page layout, etc.

Figure 4B:
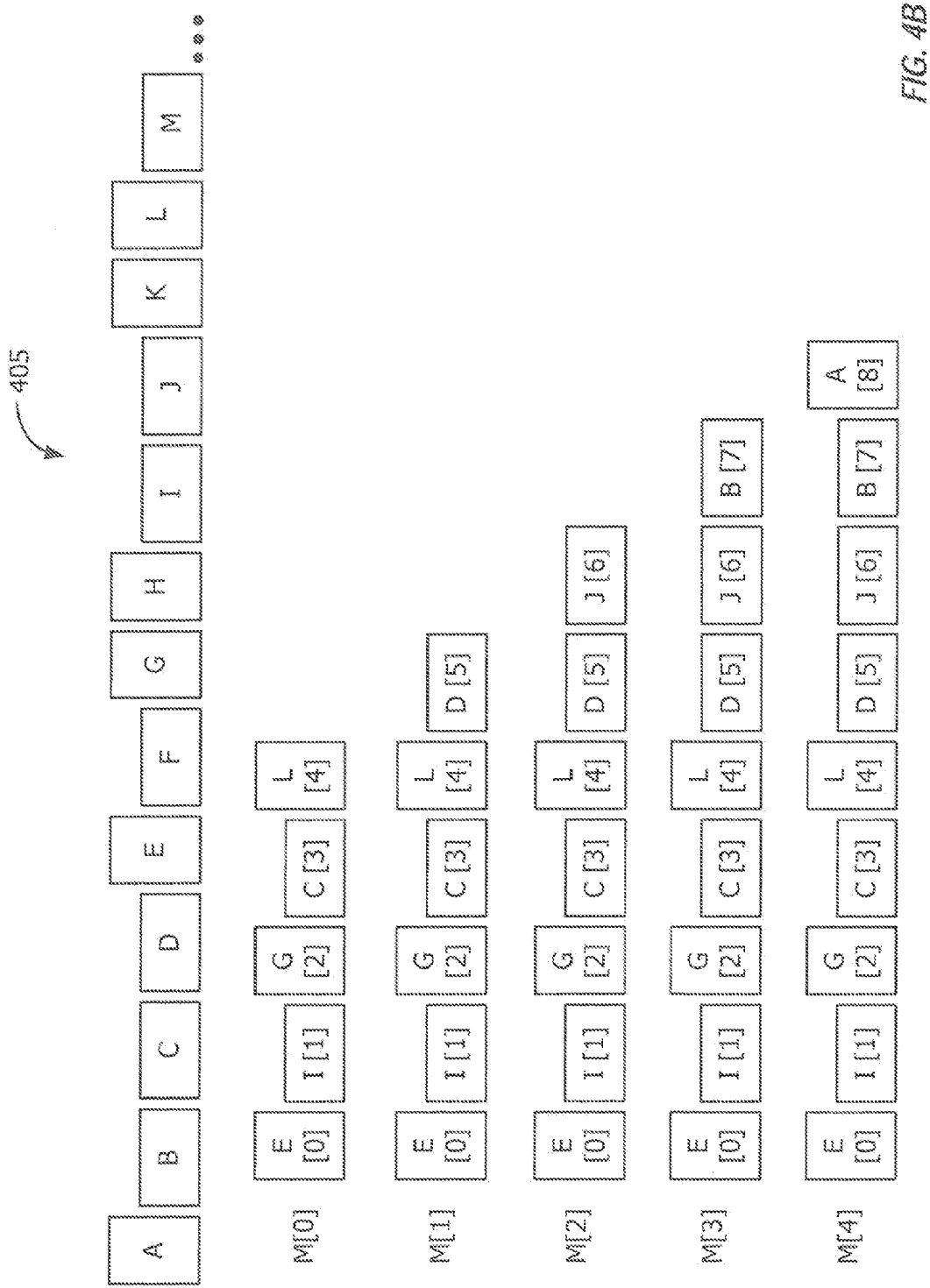

In another embodiment, the one or more media subsets may be filled based on a random ordering of available media items. This approach is illustrated in FIG. 4B. In the illustrated embodiment, the media items required to fill the largest media subset (i.e., M[4]) are randomly selected from media set 405. The additional subsets (i.e., M[0] through M[3]) are then filled using the selected media items and order corresponding to the largest subset.

The "random" approach to selecting and ordering the media items may be useful where the media items are to be displayed dynamically. For example, in one embodiment, the techniques for displaying media items in accordance with this disclosure may be utilized to scroll through available media items. In such an embodiment, the display of different subsets of media items in corresponding media arrangements may fade in and fade out as if presented as part of a slideshow. Similarly, the subsets of media items in their corresponding media arrangements, may appear to slide across a display device with one media arrangement (containing media items from a corresponding media subset) followed by another media arrangement (containing media items from a corresponding media subset). The random selection and ordering of media items from media set 405 can be utilized to continuously choose media items from the available media items and display them randomly for as long as the dynamic display is desired. In one embodiment, when a media subset of media set 405 is matched with a media arrangement, additional media subsets may be formed from the remaining media items in media set 405 and matched with other media arrangements. The media arrangements corresponding to the different media subsets of media set 405 may be appended together. In such an embodiment, the media arrangement visible to a user may actually be formed from multiple media arrangements (e.g., sub-media arrangements).

Returning to FIG. 3, a score may be determined for each media arrangement (block 320) (i.e., each media arrangement identified in block 305). Although the flowchart for arrangement operation 300 illustrates the determination of the score for each media arrangement (block 320) as occurring after the gathering of media items for the media subsets, the determination could also occur prior to collection of media items. In one embodiment, because the page layouts (and therefore the resulting media arrangements) are predefined and the score for a particular media arrangement may be independent of the media subset against which it may subsequently be measured, the score for each media arrangement may be calculated offline and only compared against a particular media subset at runtime. In such an embodiment, the media arrangement scores may be associated with a particular identifier of the media arrangement (and perhaps additional data such as an associated page layout) and stored in a data store. For example, the media arrangement scores may be stored as values in a table. Therefore, the determination of a media arrangement score for each of the media arrangements may simply involve retrieving the predefined media arrangement scores using the media arrangement identifiers.

The score for a particular media arrangement may be determined in different manners. In one embodiment, the media score may be the result of the sum of the scores of the derivatives that form the media arrangement. For example, A(x) may represent one arrangement among NA(P) possible arrangements for a particular page layout (P) and may be specified as:

$$A(x)=D(G_0),D(G_1),\ldots D(G_{NG(P)}) \quad (5)$$

where $D(G_i)$ specifies a selected derivative for a group in a page layout (P). Keeping with this notation, the media arrangement score for such an arrangement may be defined as:

$$S(A(x)) = \sum_{i=0}^{NG(P)} S(D(G_i)) = \sum_{i=0}^{NG(P)} \sum_{k=0}^{NF(D(G_i))} S(M_k) \quad (6)$$

where $NF(D(G_i))$ is equal to the number of media frames for a selected derivative of group $G_i$ and where $S(M_k)$ is the score for a particular media frame ($M_k$). It will be understood that the score for a particular media arrangement is highly dependent on the score function $S(M_k)$. Therefore, very different scores could be generated by altering the score function (e.g., using a weighted sum rather than a simple sum as discussed above). As will be described in greater detail below, the score associated with a media arrangement will be used to match the media arrangement with a given subset of media items. As such, the score function should incorporate factors that are indicative of the "closeness" of the media arrangement with a particular subset of media items. Some factors that should be considered when defining the scoring function include the typical number of media items in a media set, the number of media arrangements, the typical number of media frames per page layout, the different aspect ratios of the media frames, the inclusion of ordering media items by importance, processing requirements, and battery life performance of a device on which the arrangement operation is executed. In general, it is important that a balance is struck between identifying an ideal arrangement and the processing costs of identifying such an arrangement.

It should be noted that where a single numeric score is generated for each particular media arrangement (as in the above-described summation method), there is a potential that false positives may lead to the selection of an improper media arrangement for the display of items within a particular media subset if the score function is not specifically tailored to account for the differences between media arrangements. By way of example, if the score function was simply defined in terms of the aspect ratio of a media frame in a particular media arrangement (i.e., $S(M_k)$=frame width/frame height), media arrangements 215 and 220 in FIG. 2 would result in the same media arrangement score. A particular media subset that includes media items having orientations of (M[n][0]=landscape, M[n][1]=portrait, M[n][2]=landscape, M[n][3]=landscape, . . . ) and where media items are fit into the media arrangement by frame position from left to right with top to bottom priority for identical abscissa would be best suited for display in arrangement 215. However, because arrangements 215 and 220 would generate identical media arrangement scores using the simple aspect ratio score function, arrangement 220 may be identified as the appropriate match, in which case media items M[n][0] and M[n][1] would need to be cropped in order to fit the media frames. Due to this false positive problem, it is important that the score function be crafted in a manner in which a generated total score distinguishes between these types of subtle differences in various media arrangements.

In another embodiment, rather than a single numerical score, the media arrangement score may be specified as an array of values. In one embodiment, as will be described in greater detail below, a media arrangement score may be specified as an array of binary values where a first value represents a portrait orientation of a media frame and a second value represents a landscape orientation of a media frame. In such an embodiment, the array of binary values may be ordered in the same manner in which the media items are fit into media frames of the media arrangement (e.g., by importance, left to right, etc.). For example, the first value in the array may represent the orientation of the first media frame to be filled by the first media item in a media subset, and so on. In one embodiment, multiple media arrangement scores may be determined for a single media arrangement based on different orders of fitting media items into media frames. For example, a first media arrangement score may be determined for fitting media items in an order based on importance and a second media arrangement score may be determined for fitting media items in chronological order. The array of values for various media arrangements may be compared against an array of corresponding values for a media subset in order to identify the most appropriate media arrangement for displaying the media items in the media subset. This type of score may be beneficial for multiple reasons. First, identification of an appropriate media arrangement using the binary array technique may be relatively inexpensive computationally. The generation of an array of binary values representing the orientation of each media item in a media subset may be performed quickly and without any significant demand on processing resources. Moreover, the comparison of the score for a particular media subset with the scores for various media arrangements may be performed, at least in part, as a simple binary logic operation, which is also computationally inexpensive. Therefore, the binary array score technique may be useful when the disclosed arrangement techniques are to be performed on a device having limited processing capabilities, such as mobile devices. Second, the ordering of media frame scores in an array to be compared to corresponding scores of a media subset array essentially eliminates the above-described false positive problem by ensuring a direct comparison of corresponding items (i.e., a media frame and a media item that would be fit within the media frame).

In another embodiment, a media arrangement score may include an array of numerical values rather than an array of binary values. In one embodiment, the arrangement score may include a numerical value representing an aspect ratio of a media frame. For example, an array of [1.778, 1, 0.5625, . . . ] might indicate that the first three media frames to be filled in the corresponding media arrangement have aspect ratios of 16:9, 1:1, and 9:16. In another embodiment, the arrangement score may include a numerical value representing an importance of a media frame in a media rating. For example, an "importance" function may assign a numerical value representing the "importance" of a media frame in a media arrangement based on factors such as the media frame's closeness to the center of the page layout (e.g., a measure quantifying the distance between the media frame center point and the page center point), the size of the media frame, and other relevant factors. In yet another embodiment, a media arrangement score may be expressed as an array having multiple numerical values per media frame. For example, the media arrangement score may include values representing a media frame's aspect ratio, importance, or other values to describe the media frame. Just as with the binary array described above, the media subset may be expressed as an array having values that correspond to the media arrangement score array. However, rather than a binary operation, the corresponding values may be compared using a mathematical operation to express the relationship of the corresponding elements. The expression of a media arrangement score in terms of an array of numerical values may maintain the above described benefit of substantially eliminating the possibility of false positives. Moreover, although the generation and manipulation of arrays of numerical values may be more computationally expensive than arrays of binary values, the numerical value arrays may result in a more accurate matching of a media subset and a media arrangement.

After the media arrangement scores have been determined, a media score may be determined for each media subset (block 325). The media subset scores may correspond to the media arrangement scores. For example, a comparison of the media arrangement scores and media subset scores may be most meaningful where the factors used to determine the media arrangement scores are the same as the factors used to determine the media subset scores. As such, in an embodiment in which the media arrangement scores are expressed as a single value, the media subset scores may also be expressed as a single value. In such an embodiment, in a similar manner to the calculation of the media arrangement score in Equation 6, the media subset score may be calculated as:

$$S(M[y]) = \sum_{z=0}^{NM(M[y])} S(M[y][z]). \tag{7}$$

In one embodiment, the score function applied to each media item in each of the media subsets M[y] in accordance with Equation 7 may be the same or a similar score function utilized to determine the media arrangement score. For example, if the media arrangement score function includes terms directed to evaluating certain properties of a media frame in a media arrangement (e.g., aspect ratio, importance, etc.), the score function applied to media items of a media subset may evaluate the same properties with respect to the media items.

In another embodiment, as described above with respect to the determination of media arrangement scores, the media subset scores may be expressed in terms of an array of values. For example, the score for each media subset may be expressed as an array of binary values or as an array of numerical values. In such an embodiment, corresponding elements of the media arrangement score array and media subset score array may be compared to identify the relationship between a media subset and a media arrangement.

After the scores for the one or more media subsets have been determined, each media subset score may be compared with each media arrangement score to generate a comparison score (block 330). In one embodiment, the scores for a particular media subset may be compared against only the scores for media arrangements having a number of media frames that corresponds to the number of media items in the media subset. In another embodiment, each media subset may be compared against each of the media arrangement scores regardless of the number of media items that are supported by a particular media arrangement. In such an embodiment, the comparison of media item scores with media arrangement scores may include a function that includes a penalty for mismatches between the number of media items in a media subset and the number of media frames in a media arrangement. In one embodiment, the comparison score for each media subset/media arrangement pair may be expressed as:

$$|S(A(x))-S(M[y])|. \tag{8}$$

As set forth above, the media arrangement and media subset scores may be expressed in different forms (e.g., single numerical score, array of binary values, array of numerical values, etc.). Therefore, the comparison scores may be expressed in different forms as well. For example, the comparison score for a given media subset and a given media arrangement may be expressed as a single numerical value that represents the difference between the single numerical scores for the media subset and media arrangement, as an array of binary values representing a logical comparison of corresponding elements of the binary value array scores of the media subset and media arrangement, as an array of numerical values representing a mathematical comparison of corresponding elements of the numerical value array scores of the media subset and media arrangement, or any other manner that reflects the relationship between a media subset and media arrangement. In one embodiment, a comparison score expressed in any form other than a single numerical value may be operated on to distill the score to a single value. For example, a comparison score in the form of an array of binary values may be expressed as a numerical value representing the number of high bits, the percentage of the total number of bits that are high bits, etc. Similarly, a comparison score in the form of an array of numerical values may be expressed as a numerical value representing the sum of the array values, the average of the array values, etc. In such an embodiment, the individual elements of a comparison score expressed as an array may be weighted in order to arrive at the final numerical comparison score. For example, where a media subset is ordered by importance and a media arrangement's frames are to be filled in order of importance, the elements of the array representing the comparison of the most important media items/media frames may be weighted more heavily such that the comparison score favors matching the most important media items/media frames.

After the comparison scores are generated, the most closely related media subset/media arrangement pair may be identified (block 335). In one embodiment, where the comparison scores reflect the calculated differences between a media subset and a media arrangement, the media subset/media arrangement pair having the lowest comparison score may be identified as the most closely related pair. Based on the identification of the most closely related media subset/media arrangement pair, the media items from the identified media subset may be inserted into the media frames of the identified media arrangement (block 340). It will be understood that, where a media item shares an aspect ratio with its corresponding media frame, no modification of the media item is necessary, but where the aspect ratios differ, the media item may need to be modified (e.g., cropped) in order to be displayed within the media frame. In one embodiment, the media items from the media subset may be placed into the media frames from left to right with top to bottom priority for identical abscissa in the order in which the media items are stored in the media subset array. This type of placement of media items may avoid the appearance of "holes" in the presentation in situations where a media subset contains fewer media items than the media arrangement contains frames (i.e., unfilled media frames will appear at the periphery of the media arrangement). In another embodiment, the media items may be ordered by importance in the media subset and may be inserted into the media frames in accordance with an importance ranking of the media frames.

Figure 5A:
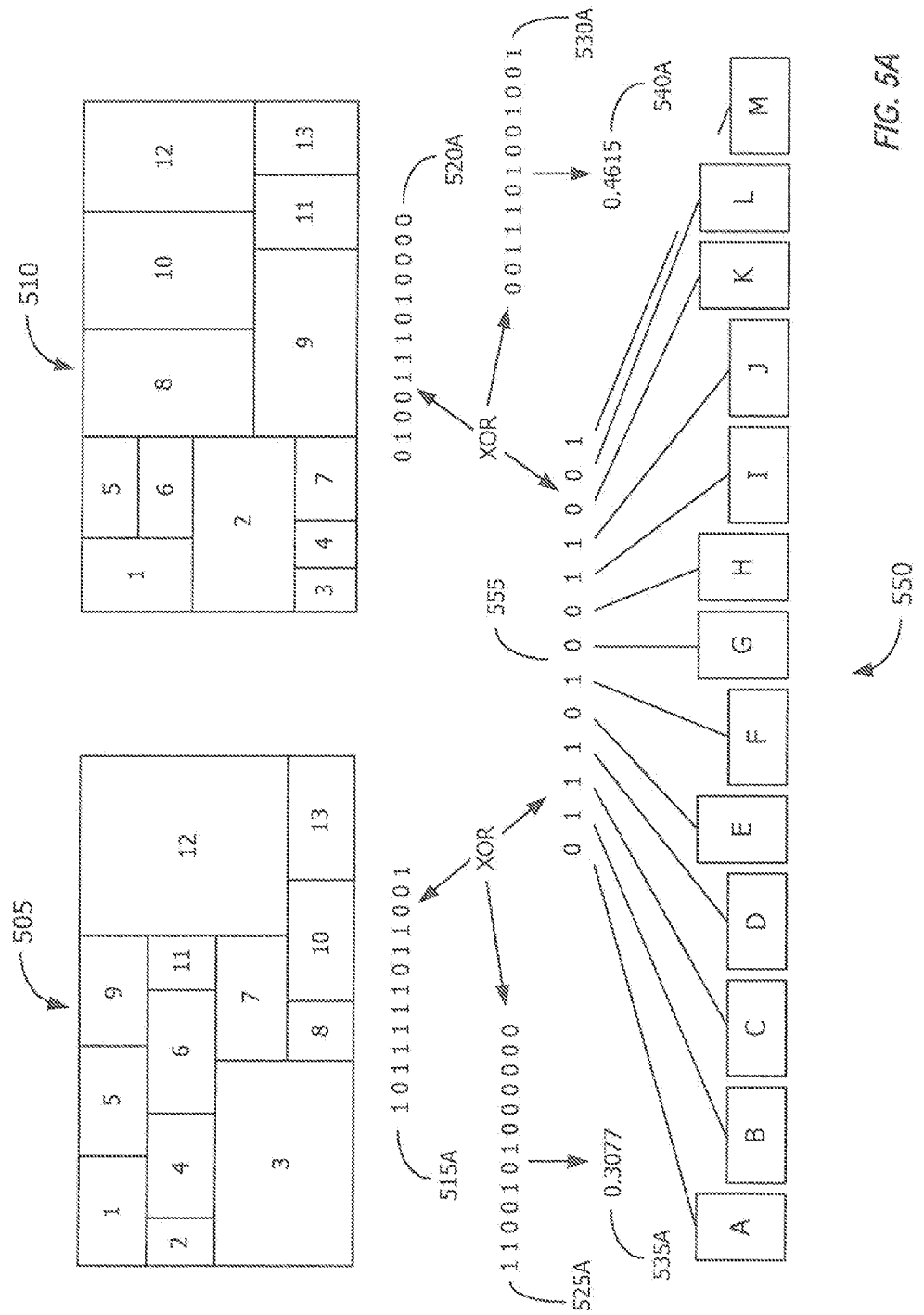
FIG. 5A illustrates a comparison of two different media arrangements with a media subset to identify the most appropriate media arrangement for displaying the media items in the media subset based on a chronological ordering of media items.

Referring to FIG. 5A, an embodiment of arrangement operation 300 generates media arrangement and media subset scores as binary arrays. In the illustrated embodiment, media arrangements 505 and 510 are compared against media subset 550 to determine the most appropriate media arrangement for displaying the media items in media subset 550. The media items in media subset 550 are ordered chronologically. For example, the media items in media subset 550 may be selected from a media set (either randomly or based on a predefined structure) and ordered chronologically within media subset 550 using metadata that represents a capture time for each of the media items.

The media frames within each of media arrangements 505 and 510 are numbered in the order in which the frames are to be filled with media items. As illustrated, the media frames for each arrangement are to be filled from left to right and from top to bottom. Based on this ordering, a media arrangement score is generated for each of media arrangements 505 and 510. Media arrangement scores 515A and 520A, corresponding to media arrangements 505 and 510, respectively, are expressed as an array of binary values that describe the orientation of media frames within the media arrangement (where 1 represents a landscape orientation and 0 represents a portrait orientation) in the order in which the media frames are to be filled. Similarly, media subset score 555 is expressed as an array of binary values that describe the orientation of media items within media subset 550 (using the same notation as media arrangement scores) based on the order of media items in subset 550. Media subset score 555 may then be compared with each of media arrangement scores 515A and 520A. In the illustrated embodiment, the comparison of media subset score 555 with each of media arrangement scores 525A and 530A is performed as a bitwise "exclusive or" operation on corresponding bits of the media subset and media arrangement scores. This logical operation generates comparison arrays 525A and 530A, which identify mismatches between the orientation of corresponding media items of media subset 550 and media frames of media arrangements 505 and 510. For example, comparison array 525A indicates mismatches between the orientations of media item A and frame 1 of arrangement 505, media item B and frame 2 of arrangement 505, media item E and frame 5 of arrangement 505, and media item G and frame 7 of arrangement 505. From comparison arrays 525A and 530A, numerical comparison scores 535A and 540A may be generated. In the illustrated embodiment, numerical comparison scores represent the ratio of high bits to the total number of bits in the comparison arrays (i.e., the ratio of mismatched media items/media frames to the total number of media frames). The lowest of the numerical comparison scores representing the closest match between media subset 550 and a corresponding media arrangement may then be identified. Of media arrangements 505 and 510, media subset 550 is most closely related to media arrangement 505. Therefore, the media items from media subset 550 may be displayed in media arrangement 505. For example, media item A may be displayed within media frame 1 of arrangement 505, media item B displayed in media frame 2 of arrangement 505, media item C displayed in media frame 3 of arrangement 505, and so on. Although the comparison operation illustrated in FIG. 5A shows only a single media subset and two media arrangements for purposes of clarity, it will be understood that the comparison operation can be expanded to support any number of media subsets and media arrangements (within the constraints of the processing device performing the comparison operation).

As described above, the generation of an array of binary values and the logical comparison of corresponding binary values are relatively inexpensive operations computationally. Moreover, the media arrangement scores for any number of media arrangements may be pre-computed prior to matching the arrangements with a particular media subset.

Therefore, at runtime, in accordance with the illustrated embodiment, a media subset score could be generated, media arrangement scores for a particular group of media arrangements could be retrieved (e.g., from a table), the media subset score could be compared to each of the media arrangement scores, and the most closely related media arrangement could be identified for display of the media items in the media subset. Because these operations can be performed without a significant processing burden where the scores include binary arrays and the comparisons include logical operations, the binary array operation may be particularly well suited for identifying a media arrangement for the display of media items on a device having limited processing capacity, such as a mobile device.

Figure 5B:
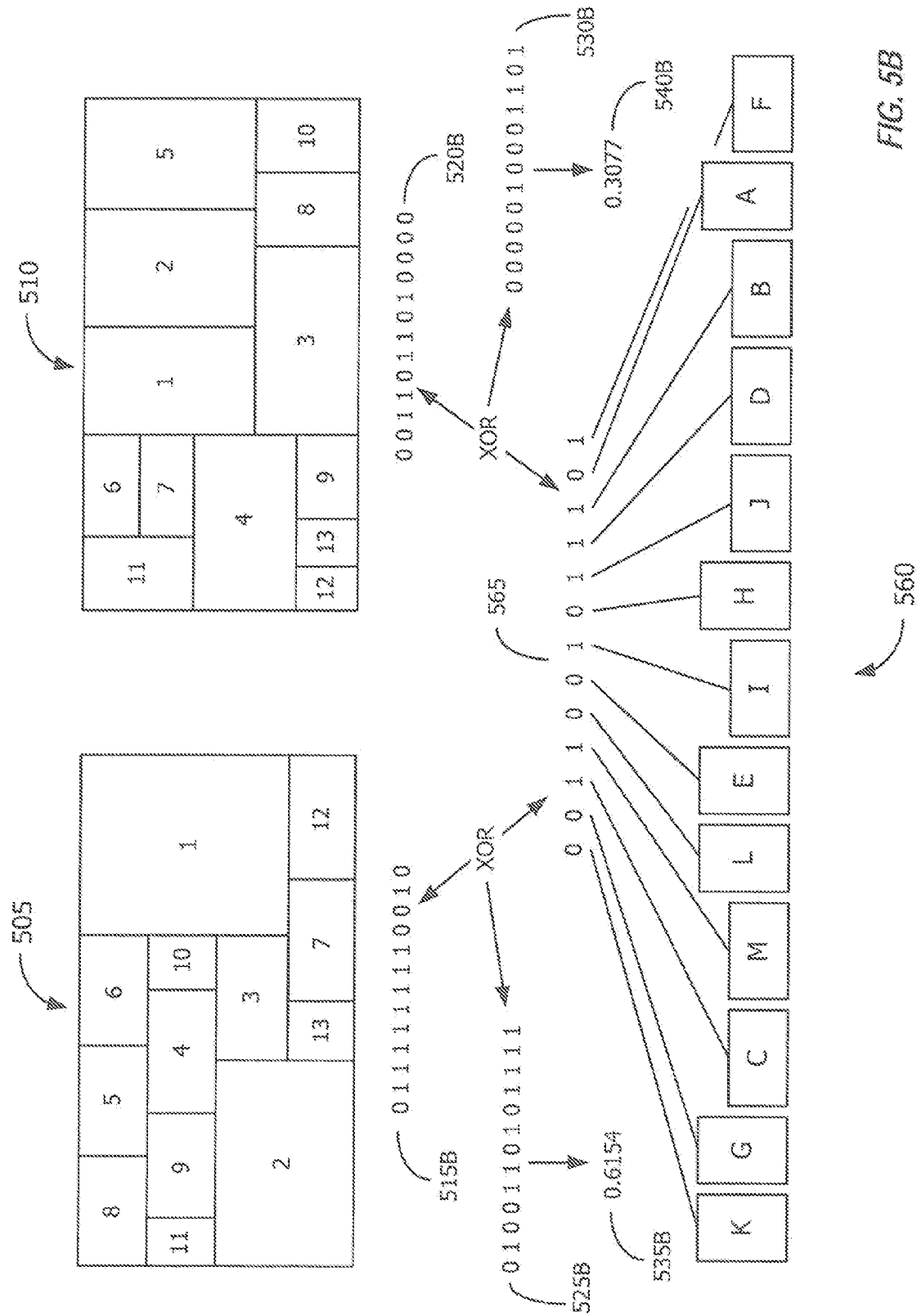
FIG. 5B illustrates a comparison of two different media arrangements with a media subset to identify the most appropriate media arrangement for displaying the media items in the media subset based on an importance ordering of media items.

Referring to FIG. 5B, media arrangements 505 and 510 are evaluated against media subset 560. Media subset 560 includes the same media items as media subset 550 of FIG. 5A. However, the media items in media subset 560 are arranged in order of importance rather than chronologically. Accordingly, the media frames in media arrangements 505 and 510 are also arranged in order of importance. That is, the most important media item in media subset 560 will be fit to the most important media frame of the corresponding media arrangement. Although media arrangements 505 and 510 are the same as the arrangements illustrated in FIG. 5A, media arrangement scores 515B and 520B differ from media arrangement scores 515A and 520A based on the different ordering of frames in the media arrangements (i.e., by importance rather than left-to-right). Consequently, it will be noted that a particular media arrangement may have more than one predetermined media arrangement score based on the manner in which its media frames are to be filled. Similarly, although media subset 560 includes the same media items as media subset 550, media subset score 565 differs from media subset score 555 because the scores incorporate the ordering of media items within the media subsets. The comparisons of media arrangement scores 515B and 520B with media subset score 565 may be performed in the same manner as described with respect to FIG. 5A to generate comparison arrays 525B and 530B, which may, in turn, be utilized to generate numerical value comparison scores 535B and 540B. In the illustrated embodiment, media subset 560 is more closely related to arrangement 510 than arrangement 505. Therefore, the media items from media subset 560 may be displayed in media arrangement 510. For example, media item K may be displayed in media frame 1 of media arrangement 510, media item G may be displayed in media frame 2 of media arrangement 510, media item C may be displayed in media frame 3 of media arrangement 510, and so on. FIGS. 5A and 5B illustrate that different media arrangements may be appropriate for different preferred orderings of media items. The disclosed techniques enable a group of media items to be compared with multiple predefined media arrangements to identify the media arrangement that is most closely related to the group of media items such that the media items can be displayed using the identified media arrangement.

Referring to FIG. 6, a simplified functional block diagram of illustrative electronic device 600 is shown according to one embodiment. Electronic device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, digital image capture unit 650, video codec(s) 655, memory 660, storage 665, and communications bus 670. Electronic device 600 may be, for example, a digital camera, a personal digital assistant (PDA), personal music player, mobile telephone, server, notebook, laptop, desktop, or tablet computer. More particularly, the disclosed techniques may be executed on a device that includes some or all of the components of device 600.

Processor 605 may execute instructions necessary to carry out or control the operation of many functions performed by device 600. Processor 605 may, for instance, drive display 610 and receive user input from user interface 615. User interface 615 can take a variety of forms, such as a button, keypad, dial, a click wheel, keyboard, display screen and/or a touch screen. Processor 605 may also, for example, be a system-on-chip such as those found in mobile devices and include a dedicated graphics processing unit (GPU). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 to process graphics information. In one embodiment, graphics hardware 620 may include a programmable graphics processing unit (GPU).

Sensor and camera circuitry 650 may capture still and video images that may be processed, at least in part, in accordance with the disclosed techniques by video codec(s) 655 and/or processor 605 and/or graphics hardware 620, and/or a dedicated image processing unit incorporated within circuitry 650. Images so captured may be stored in memory 660 and/or storage 665. Memory 660 may include one or more different types of media used by processor 605 and graphics hardware 620 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one or more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to tangibly retain computer program instructions or code organized into one or more modules and written in any desired computer programming language. When executed by, for example, processor 605 such computer program code may implement one or more of the operations described herein.

It is to be understood that the above description is intended to be illustrative, and not restrictive. The material has been presented to enable any person skilled in the art to make and use the inventive concepts described herein, and is provided in the context of particular embodiments, variations of which will be readily apparent to those skilled in the art (e.g., some of the disclosed embodiments may be used in combination with each other). Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by a processor and comprising instructions stored thereon to cause one or more processors to:
identify a set of media arrangements, wherein each media arrangement is assigned an array of media arrangement score values that represent one or more properties of each of the media arrangements, and wherein each media arrangement comprises a layout for arranging media items;
generate an array of media score values for a set of media items that represents one or more properties of the media items in the set of media items;
compare the array of media score values with each of the arrays of media arrangement score values to generate arrays of comparison score values, wherein each array of comparison score values represents mismatches between the array of media score values and one of the arrays of media arrangement score values, and wherein the comparison includes penalizing for mismatches between the number of media items in the set of media items and a number of media frames in each of the media arrangements;
identify a media arrangement to display the set of media items based, at least in part, on the arrays of comparison score values; and
provide one or more instructions to display the set of media items using the identified media arrangement.

2. The non-transitory program storage device of claim 1, wherein the instructions to cause the one or more processors to identify the set of media arrangements comprise instructions to cause the one or more processors to:
identify the plurality of media arrangements that correspond to one or more page layouts;
identify one or more groups corresponding to each of the one or more page layouts; and
identify one or more derivatives corresponding to each of the one or more groups.

3. The non-transitory program storage device of claim 1, wherein the instructions to cause the one or more processors to generate an array of media score values comprise instructions to cause the one or more processors to evaluate an aspect ratio of each of the one or more media items in the set of media items.

4. The non-transitory program storage device of claim 1, wherein the array of media arrangement score values for each of the media arrangements is dependent on at least one score function for at least one media frame that forms each of the media arrangements.

5. The non-transitory program storage device of claim 1, wherein the instructions to cause the one or more processors to generate an array of media score values comprise instructions to cause the one or more processors to generate an ordered set of values, and wherein the ordered set of values corresponds to the media items in the set of media items.

6. The non-transitory program storage device of claim 1, wherein the instructions to cause the one or more processors to compare the array of media score values with each of the arrays of media arrangement score values comprise instructions to cause the one or more processors to perform a logical operation on the array of media score values and each of the arrays of media arrangement score values.

7. The non-transitory program storage device of claim 1, wherein the instructions further cause the one or more processors to identify the number of media items supported by each of the media arrangements by determining a maximum number of media items supported by the set of media arrangements and a minimum number of media items supported by the set of media arrangements.

8. The non-transitory program storage device of claim 7, wherein the instructions further cause the one or more processors to obtain the set of media items and a plurality of other sets of media items based on the maximum number of media items and the minimum number of media items supported by the set of media arrangements.

9. A method, comprising:
identifying, using one or more processors, a set of media arrangements, wherein each media arrangement is associated with an array of media arrangement score values determined from one or more properties of each of the media arrangements, and wherein each media arrangement is a layout for arranging media items;
generating for a set of media items, using the one or more processors, an array of media score values based, at least in part, on one or more properties of the media items in the set of media items;
comparing, using the one or more processors, the array of media score values with each of the arrays of media arrangement score values to generate arrays of comparison score values, wherein each array of comparison score values represents mismatches between the array of media score values and one of the arrays of media arrangement score values, and wherein the comparing includes penalizing for mismatches between the number of media items in the set of media items and a number of media frames in each of the media arrangements;
identifying, using the one or more processors, a media arrangement to display the set of media items based, at least in part, on the arrays of comparison scores; and
providing, using the one or more processors, one or more instructions to display the media items in the identified media arrangement.

10. The method of claim 9, wherein each of the arrays of media arrangement score values is based on at least one score function for at least one media frame used to form each of the media arrangements.

11. The method of claim 9, wherein the array of media score values comprises an ordered set of binary values, the binary values corresponding to orientations of media items in the set of media items.

12. The method of claim 9, wherein comparing the array of media score values with each of the arrays of media arrangement score values comprises performing a binary logic operation on corresponding values in the array of media score values and each of the arrays of media arrangement score values to generate the arrays of comparisons score values, each array of comparison score values comprising an ordered set of binary values.

13. The method of claim 9, further comprising identifying, using the one or more processors, the number of media items supported by each of the media arrangements by determining a maximum number of media items supported by the set of media arrangements and a minimum number of media items supported by the set of media arrangements.

14. The method of claim 13, further comprising obtaining the set of media items and a plurality of other sets of media items based on the maximum number of media items and the minimum number of media items supported by the set of media arrangements.

15. A system, comprising:
a memory;
a display device; and one or more processors operatively coupled to the memory and the display device and configured to execute program code stored in the memory to cause the one or more processors to:
- determine an array of media arrangement score values for each of a set of media arrangements that is based on one or more properties of the media arrangements, wherein each media arrangement is a layout for arranging media items;
- divide a set of media items into one or more media item subsets;
- generate an array of media score values for each of the one or more media item subsets based, at least in part, on one or more properties of the media items;
- compare the array of media score values for each of the media item subsets with each of the arrays of media arrangement score values to generate arrays of comparison score values, wherein each array of comparison score values distinguishes mismatches between the array of media score values and one of the arrays of media arrangement score values, and wherein the comparison includes penalizing for mismatches between the number of media items in the set of media items and a number of media frames in each of the media arrangements;
- identify a media item subset-media arrangement pair that is most closely related based, at least in part, on the arrays of comparison scores; and
- assign each media item in the media item subset of the identified pair to a corresponding media frame of the media arrangement of the identified pair for display on the display device.

16. The system of claim 15, wherein the program code to cause the one or more processors to divide a set of media items into one or more media item subsets comprises program code to determine a maximum number of media items and a minimum number of media items supported by the set of media arrangements, wherein the number of media item subsets is based on the difference of the maximum number of media items and the minimum number of media items.

17. The system of claim 15, wherein each of the arrays of media arrangement score values is based on at least one score function for at least one media frame that forms each of the media arrangements.

18. The system of claim 17, wherein the program code to cause the one or more processors to generate an array of media score values for each of the one or more media item subsets comprises program code to cause the one or more processors to generate an ordered set of binary values, the binary values corresponding to orientations of media items in the media item subset, wherein the binary values are ordered according to an order of the media items in the media item subset.

19. The system of claim 18, wherein the program code to cause the one or more processors to compare the array of media score values for each of the media item subsets with each of the arrays of media arrangement values to generate arrays of comparison scores comprises program code to cause the one or more processors to perform a logical operation on the array of media score values and the arrays of media arrangement score values.

* * * * *